United States Patent [19]

Moradians

[11] Patent Number: 5,738,199
[45] Date of Patent: Apr. 14, 1998

[54] DIVERTER ROLLER ASSEMBLY FOR LOADING AND UNLOADING CARGO IN A VEHICLE

[75] Inventor: Edward Moradians, Canoga Park, Calif.

[73] Assignee: Ancra International Corporation, Hawthorne, Calif.

[21] Appl. No.: 561,892

[22] Filed: Nov. 22, 1995

[51] Int. Cl.$^6$ ..................................................... B65G 13/00
[52] U.S. Cl. .................... 193/35 R; 193/35 MD; 244/137.1; 414/534
[58] Field of Search ................... 198/367; 193/35 R, 193/35 MD, 36; 244/137.1; 414/529, 531–535

[56] References Cited

U.S. PATENT DOCUMENTS

| | | | |
|---|---|---|---|
| 3,294,263 | 12/1966 | Naden et al. | 414/534 |
| 4,462,493 | 7/1984 | Nordstrom . | |
| 4,695,219 | 9/1987 | McGimpsey | 414/659 |
| 4,823,927 | 4/1989 | Jensen . | |
| 4,993,899 | 2/1991 | Engel et al. | 244/137.1 |
| 5,316,242 | 5/1994 | Eilenstein-Wiegmann | 244/137.1 |
| 5,346,161 | 9/1994 | Eilenstein-Wiegmann | 244/137.1 |
| 5,609,240 | 3/1997 | Moradians | 244/137.1 |

*Primary Examiner*—Joseph E. Valenza
*Attorney, Agent, or Firm*—Edward A. Sokolski

[57] ABSTRACT

A roller assembly is removably mounted on the floor of a vehicle. The assembly has a floor unit which is mounted on the vehicle floor and an erectable unit pivotally supported on the floor unit. This assembly has a retracted configuration in which the erectable unit is retracted in abutment against the floor unit. In the retracted configuration the assembly is adapted for moving cargo therelong in a first direction. The assembly further has an erected configuration in which the erectable unit is retained in a position normal to the floor unit. In this second configuration the assembly is adapted for moving cargo in a second direction at an acute angle relative to the first direction. To facilitate movement of the cargo, a first set of rollers is mounted on the floor unit of the assembly for universal movement and a second set of rollers is mounted on the erectable unit of the assembly for rotational movement about a single axis.

7 Claims, 3 Drawing Sheets

DIVERTER ROLLER ASSEMBLY FOR LOADING AND UNLOADING CARGO IN A VEHICLE

BACKGROUND OF THE INVENTION

1. Field of the Invention

This invention relates to cargo loading systems for use in loading and unloading cargo in a vehicle such as an aircraft and more particularly to a roller assembly which can be converted for moving cargo in either first or second directions at an acute angle relative to each other.

2. Description of the Related Art

Roller assemblies which are removably mounted on tracks attached to the floor of a vehicle such as an aircraft or truck are widely used for loading and unloading cargo in such vehicles. Such prior art assemblies are described in U.S. Pat. No. 4,823,927 issued Apr. 25, 1989 to Jensen and U.S. Pat. No. 4,462,493 issued Jul. 31, 1984 to Nordstrom. Such assemblies of the prior art generally employ rollers mounted in the assembly to facilitate movement of the cargo in a single direction in loading the vehicle. There are situations, however, where in one loading or unloading operation that it is desirable to move the cargo in a first direction while in another such operation to divert the cargo in a second direction at an acute angle to the first direction. It is desirable that with each such operation, movement be facilitated in only a single direction. Such alternate type of operation cannot readily be achieved with assemblies of the prior art without a reinstallation of the assembly on the mounting tracks.

BRIEF SUMMARY OF THE INVENTION

The roller assembly of the present invention can rapidly and easily be converted from an erected configuration for facilitating the movement of cargo thereon in a first direction to a retracted configuration for diverting the movement of cargo in a direction which is at an acute angle relative to the first direction.

The roller assembly of the invention has a floor unit which is removably mounted on the floor of the vehicle and an erectable unit which is pivotally mounted on the floor unit. A spring is mounted on the floor unit for urging the erectable unit towards an erected position whereat it is erected normal to the top surface of the floor unit. The erectable unit can be returned to a retracted position in opposing relationship to the floor unit by manually depressing such unit until it is lowered opposite the floor unit where it is retained in this retracted position by means of a latch. When the latch is manually released, the spring drives the erectable unit to the erected position.

The erectable unit has a cargo guide surface which runs in a first direction and a cargo guide edge which runs in a second direction at an acute angle to said first direction. The cargo guide surface provides a directional guide for the cargo when the erectable unit is in its erected position while the cargo guide edge provides a directional guide for the cargo when the erectable unit is in its retracted position.

A first set of rollers is mounted on a floor unit of the assembly for universal rotation while a second set of rollers is mounted along a cargo guide edge of the erectable unit which guides the cargo when the erectable unit is retracted.

It is therefore an object of the invention to facilitate the conversion of a vehicle roller assembly from a first configuration for handling cargo movement in a first direction to a second configuration for diverting cargo movement in a direction at an acute angle relative to the first direction.

It is a further object of the invention to provide an improved roller assembly for loading and unloading cargo in vehicles which can be readily converted to divert the movement of cargo to a different direction.

Other objects of the invention will become apparent in connection with the following description in conjunction with the accompanying drawings.

DETAILED DESCRIPTION OF THE INVENTION

Figure 1:
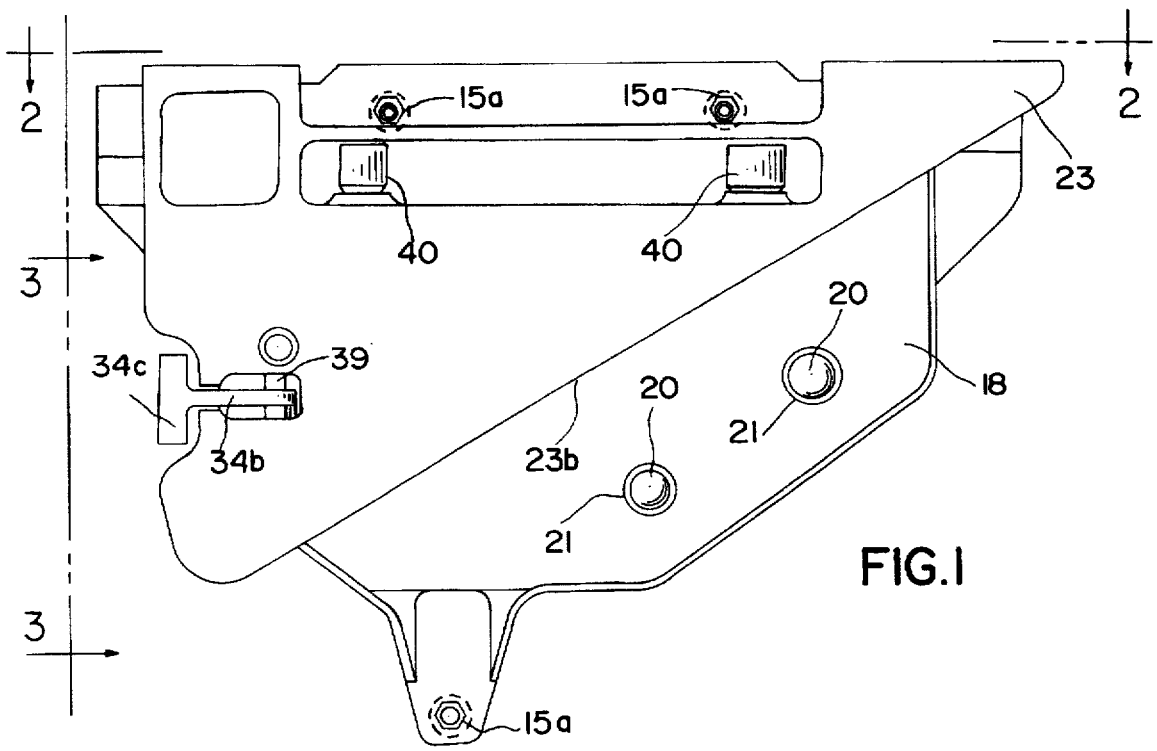
FIG. 1 is a top plan view of a preferred embodiment of the invention shown in its retracted configuration.
Figure 2:
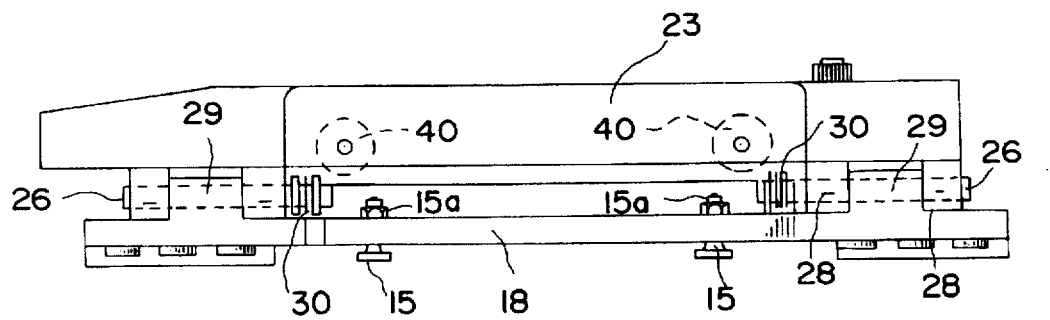
FIG. 2 is a rear elevational view of the preferred embodiment in its retracted configuration.
Figure 3:
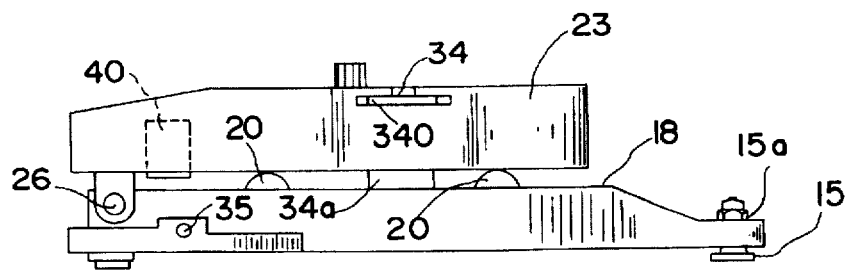
FIG. 3 is a right hand elevational view of the preferred embodiment in its erected configuration.

Referring to FIGS. 1–3 and 7, the preferred embodiment of the invention is shown in its retracted configuration.

The assembly is removably mounted on a pair of tracks (not shown) 2 by means of lugs 15 which can be fitted into the tracks at widened rounded openings thereof and then slid along the tracks to a narrow portion thereof and tightened thereto by means of nuts 15a. This type of attachment is well known in the art and is described, for example, in U.S. Pat. No. 3,480,239 issued Nov. 25, 1969 to Jensen, et al.

The assembly has a floor unit 18 which provides a support for the cargo. A set of rollers 20 which are in the form of balls are mounted for universal rotation in bearings 21, which are attached to floor unit 18. Erectable unit 23 is pivotally supported on floor unit 18 by means of a pair of rods 26 which extend through sleeves 28 formed on the erectable unit and sleeves 29 formed in the floor unit by means of sleeve bearings 39 formed in the sub-assembly. A pair of torsion springs 30 are mounted on each of rods 26, one end of these springs engaging floor unit 18 and the other end engaging erectable unit 23 in a manner so as to urge the erectable unit towards its erected position.

Figure 4:
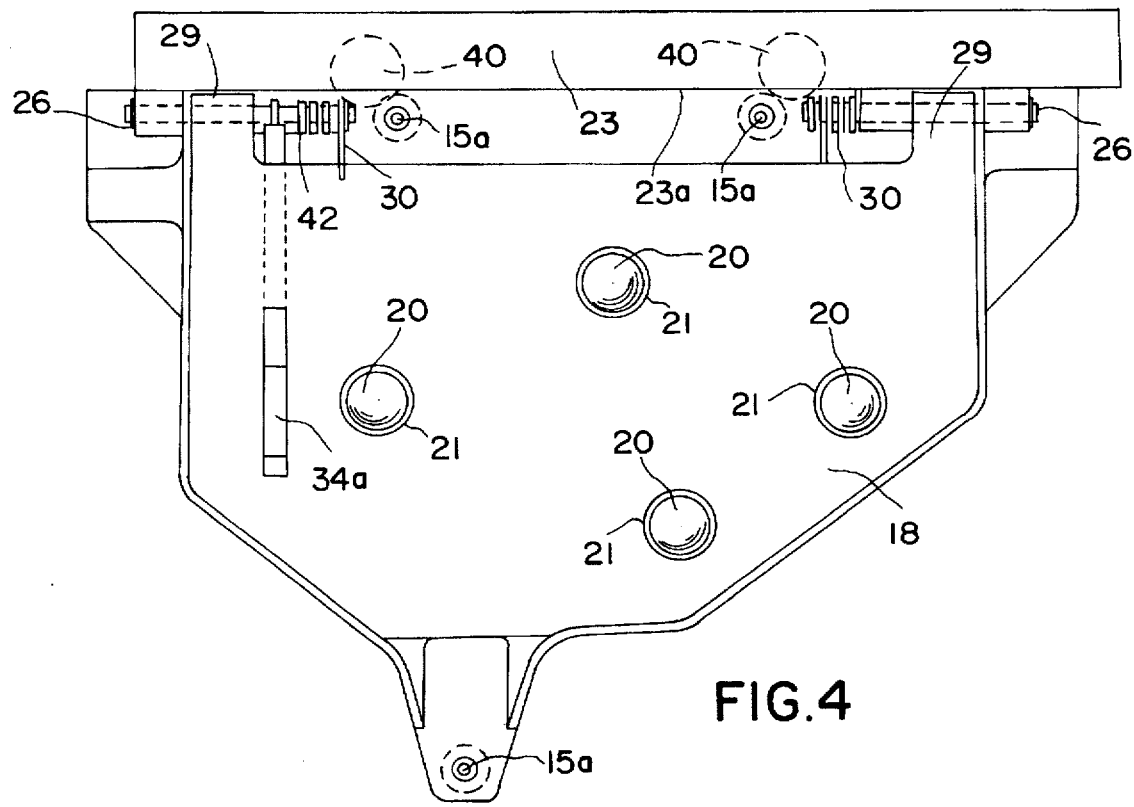
FIG. 4 is a top plan view of the preferred embodiment in its erected configuration.
Figure 7:
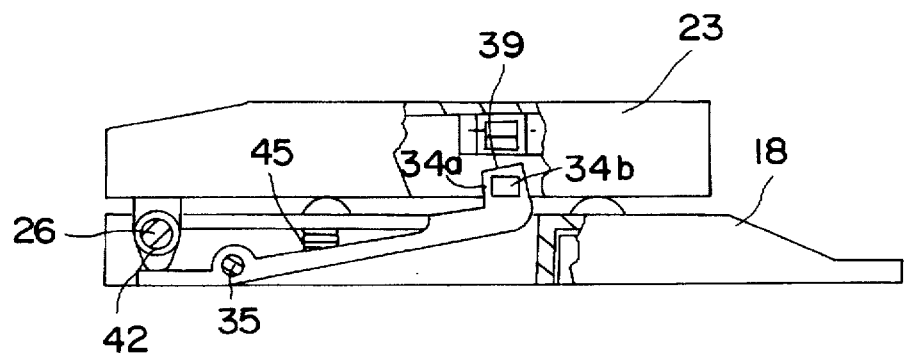
FIG. 7 is a right hand elevational view of the preferred embodiment with partial cutaway section to illustrate the latch.
Figure 8:
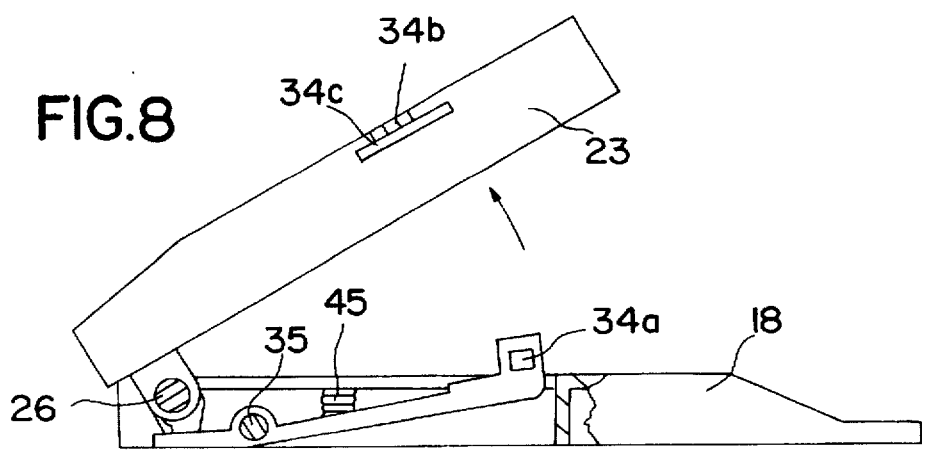
FIG. 8 is a right hand elevational view of the preferred embodiment shown in a partially erected position.

As can best be seen in FIGS. 7 and 8, erectable unit 23 is retained in its retracted position in opposing relationship to floor unit 18 by means of latch assembly 34. This assembly includes an apertured arm member 34a and hook member 34b which engages the apertured portion of member 34a. Arm member 34a is pivotally supported on shaft 35 which is fixedly attached to the floor unit. Arm member 34a is urged to a withdrawn position, as shown in FIG. 4 by means of a coil spring 45 which is positioned between the inner wall of floor unit 18 and the top surface of arm member 34a. This avoids interference with the movement of the cargo when the erectable unit is in the erected configuration. Hook member 34b is pivotally mounted on shaft 39 which is fixedly supported on erectable unit 23. When the erectable unit is moved to its retracted position, cam 42 formed on the erectable unit drives arm member 34a to an upward position where it can readily engage hook member 34b. The hook member has a handle 34c which can be used to release the latch to allow the erectable unit to be driven to the erected configuration.

Rollers 40 are installed in the bottom portion of erectable unit 23 for rotation about axis A for one of the rollers (see FIG. 5) and an axis parallel to this axis for the other roller.

Figure 5:
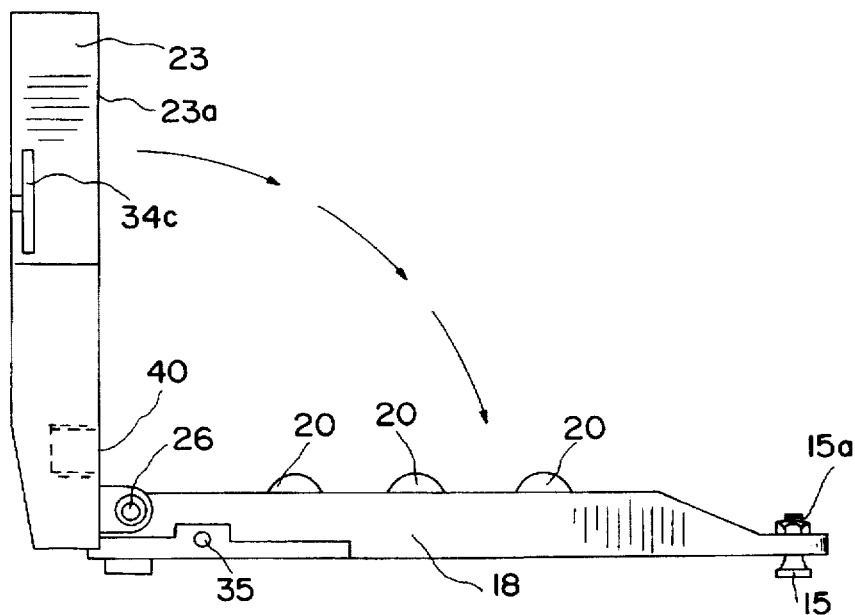
FIG. 5 is a right hand elevational view of the preferred embodiment shown in its erected configuration.
Figure 6:
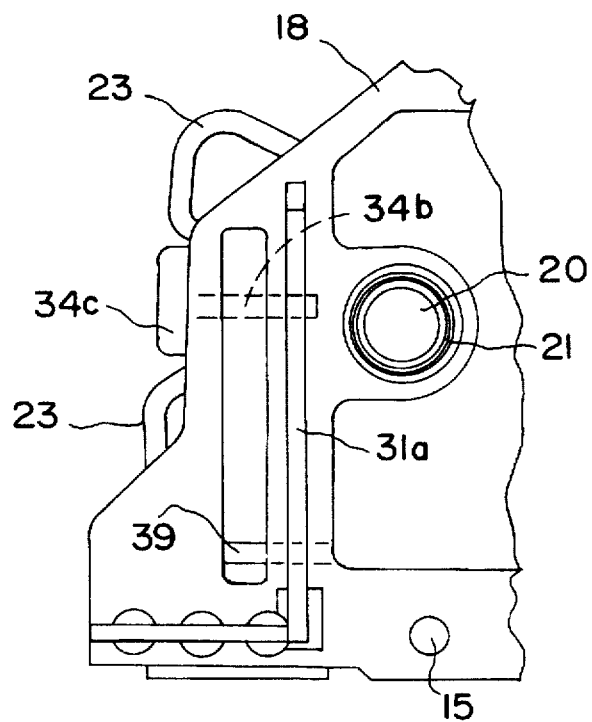
FIG. 6 is a fragmentary bottom plan view of the preferred embodiment.

With the assembly in its erected configuration, as shown in FIGS. 4 and 5, cargo can be readily moved along wall 23a of the erectable unit 23 with rollers 20 and 40 facilitating such movement.

When diversion of cargo occurs in the direction defined by cargo guide edge 23b of unit 23, as, for example, in unloading operations, the erectable unit is depressed as indicated in FIG. 5 until it is directly opposite the floor unit whereat the latch engages to retain the units in this retracted configuration. Cargo guide edge 23b will then guide the cargo therealong in the direction defined by this edge.

Thus, the device of the invention provides the flexibility of facilitating the movement of cargo either in one direction or the other, merely by actuating a latch or depressing one unit down on the other until the latch engages. This diversionary capability is particularly useful in unloading cargo through a door by moving the cargo in a lateral direction to a position aligned with the exit door.

While the invention has been described and illustrated in detail, it is to be clearly understood that this is intended by way of example only and is not to be taken by way of limitation, the scope of the invention being limited only by the terms of the following claims.

I claim:

1. A roller assembly for use in loading and unloading cargo in a vehicle comprising:

a floor unit adapted to be mounted on the floor of a vehicle;

an erectable unit pivotally supported on said floor unit;

spring means mounted on said assembly for urging said erectable unit towards an erected position substantially normal to the top surface of said floor unit, latch means for retaining said erectable unit in a retracted position in opposing relationship to said floor unit, said latch means being releasable to enable the spring means to drive said erectable unit to the erected position, said erectable unit having a cargo guide surface which runs in a first direction and a cargo guide edge which runs in a second direction which is at an acute angle to said first direction, and wheel means mounted on said floor unit for facilitating the movement of cargo thereon;

said cargo guide surface providing a directional guide for cargo when the erectable unit is in the erected position, said cargo guide edge providing a directional guide for cargo when the erectable unit is in its retracted position.

2. The roller assembly of claim 1 and further including roller means pivotally mounted on said erectable unit along said cargo guide edge for facilitating the movement of the cargo along said guide edge.

3. The roller assembly of claim 1 wherein said roller means comprises ball members mounted for universal rotation on said floor unit.

4. The roller assembly of claim 3 and further including roller means pivotally mounted on the cargo guide edge of said erectable unit for facilitating movement of the cargo along said cargo guide edge.

5. The roller assembly of claim 1 wherein said latch means comprises an arm member having an apertured portion and a hook member which engages the apertured portion of the arm member, and further including means for urging said arm member to a retracted position below the surface of said floor unit when said erectable unit is in its erected position and means for urging said arm member to a position above said floor surface when said erectable is in its retracted position in a position to engage said hook member.

6. The roller assembly of claim 5 wherein said means for urging said arm member to said retracted position comprises a spring mounted between the too surface of said arm member and a bottom surface of said floor unit.

7. The roller assembly of claim 6 wherein said means for urging said arm member to its erected position comprises a cam formed on said erectable unit which abuts against an end portion of said arm member.

* * * * *